May 1, 1928.    W. FREUND    1,668,064
SWEET CLOVER BEATER
Filed Jan. 27, 1927    2 Sheets-Sheet 1
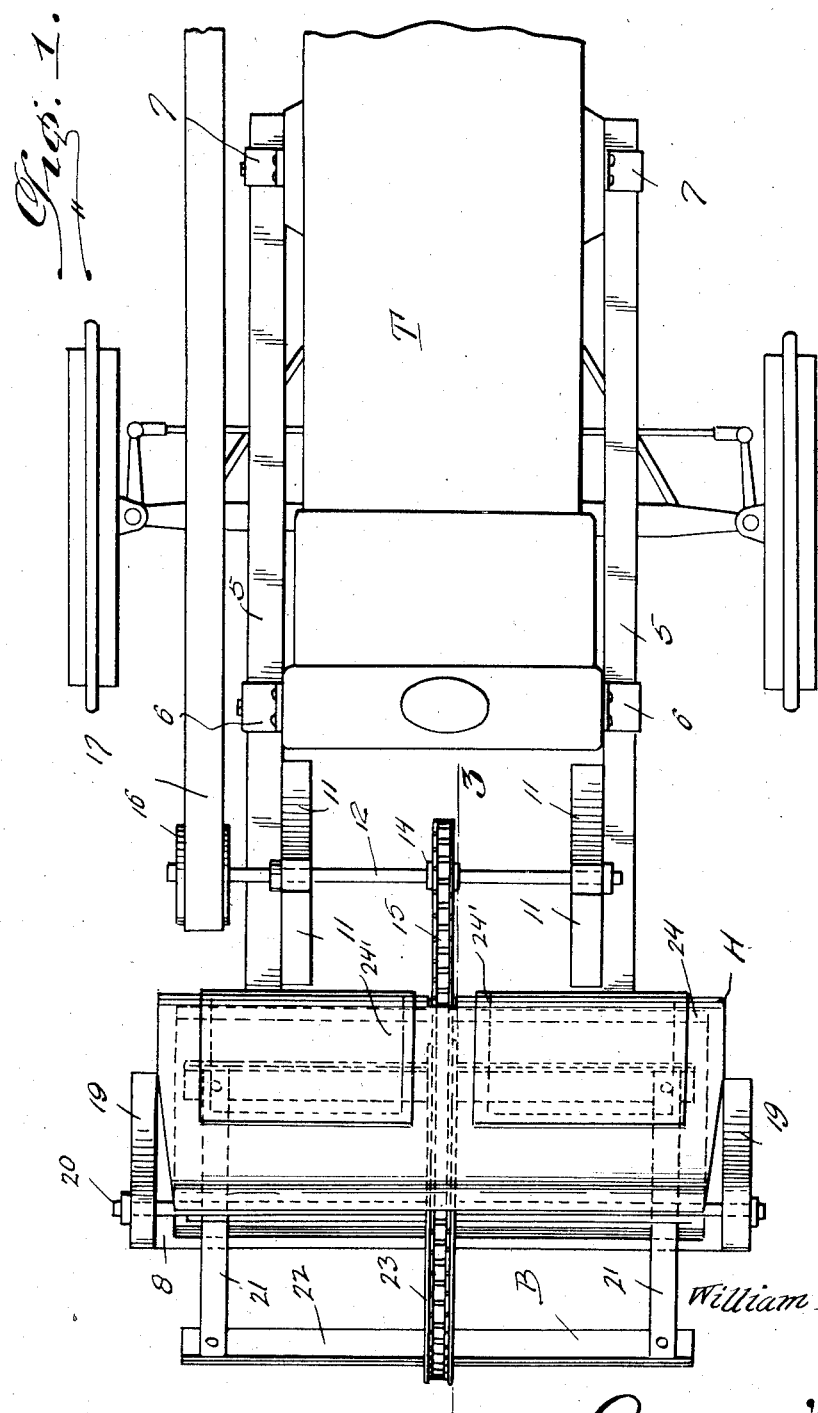
Inventor
William Freund,
By Clarence A. O'Brien
Attorney

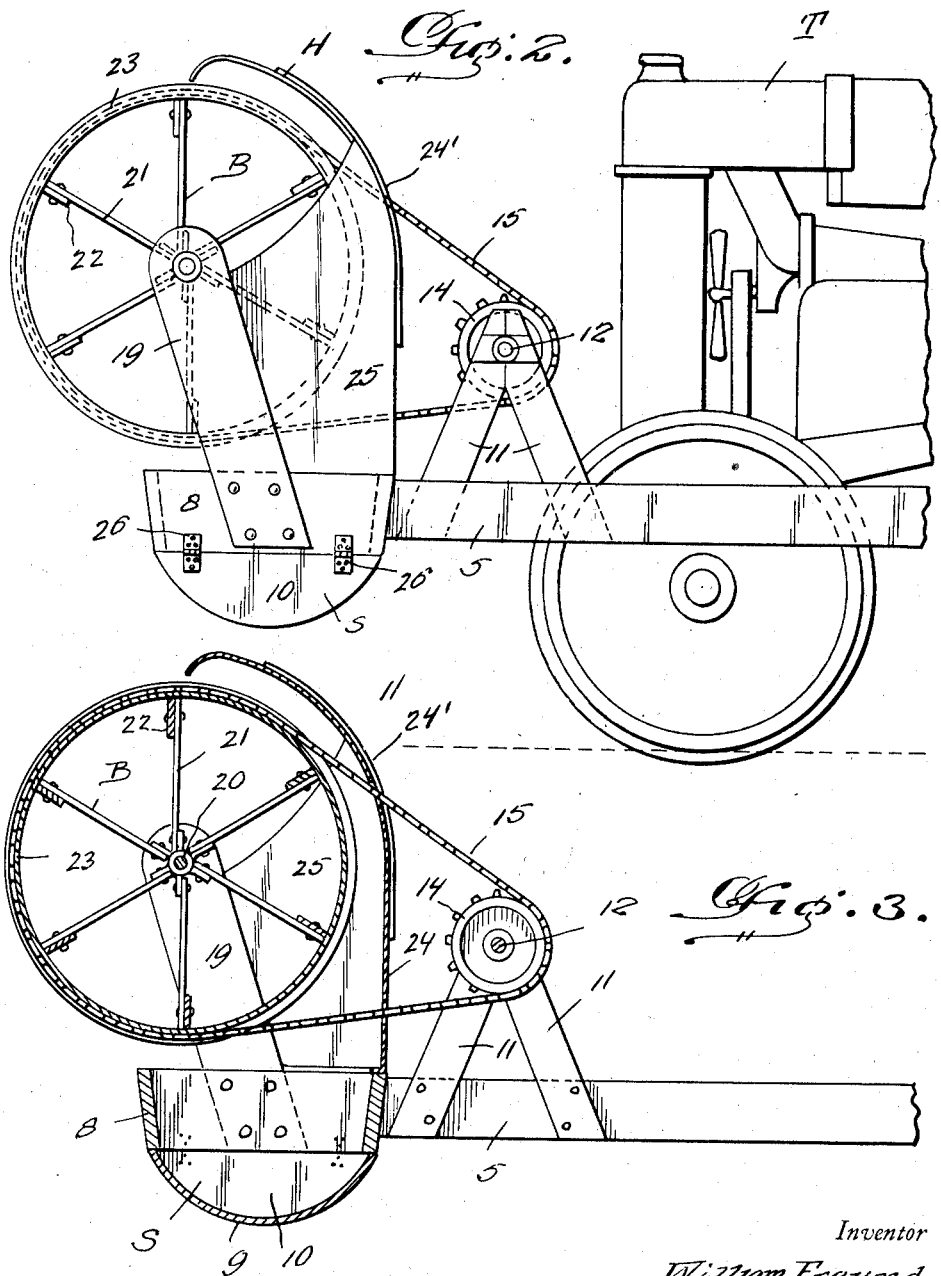

Patented May 1, 1928.

1,668,064

UNITED STATES PATENT OFFICE.

WILLIAM FREUND, OF WATERLOO, ILLINOIS.

SWEET-CLOVER BEATER.

Application filed January 27, 1927. Serial No. 163,982.

The present invention relates to a sweet clover beater and aims to provide a structure which may be mounted to the front of a tractor for gathering the seeds of sweet clover without injuring the plants thus eliminating the necessity of mowing and later threshing.

Another important object of the invention lies in the provision of a machine of this nature which is comparatively simple in its construction, strong and durable, light, throughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1 is a top plan view of the contrivance embodying the features of my invention showing the same mounted on a tractor, Fig. 2 is a side elevation thereof, Fig. 3 is a longitudinal vertical section therethrough taken on the line 3—3 of Figure 1.

Referring to the drawing in detail, it will be seen that the numerals 5 denote a pair of spaced parallel co-extensive beams which are adapted to be secured to a tractor T as at 6 and 7 so as to extend alongside of the tractor and forwardly thereof. At the forward ends of these beams 5 there is rigidly secured in any preferred manner a frame 8 of rectangular formation which has attached to the under edge thereof a seed pan S which includes a curved bottom 9 and sides 10. Standards 11 are fixed to the beams 5 and rise upwardly therefrom, a pair on each beam, the standards of each pair converging upwardly towards each other. A shaft 12 is journaled in the upper ends of the standards 11 and between the pairs of standards has mounted thereon a sprocket 14 over which is trained a chain 15. On one end of the shaft 12 to the outside of the beams 5 is a pulley 16 over which is trained a belt 17 which will be trained over the usual belt pulley provided on the tractor T (not shown) and well known in this art. Standards 19 rise from the sides of the frame 8 and incline forwardly and have a beater B journaled therebetween. The beater includes the shaft 20 journaled in the upper ends of the standards 19 and having fixed thereto spokes 21 which radiate therefrom and are connected by cross beater bars 22. A grooved pulley 23 is mounted about the bars 22 and the chain 15 is trained thereover. A hood H includes a back 24 rising from the rear of the frame 8 and curving forwardly over the beater B and has sides 25 between the back 14 and the standards 19 and rising upwardly from the ends of the frame 8. The seed pan S is held in place by hinges 26 and the pins thereof may be removed so that the seed pan may be conveniently emptied.

With this improved structure it will be seen that the sweet clover may be beaten in front of the tractor and the seeds beaten into the seed pan and the tractor will not interfere with this operation. It is to be noted that the structure contemplated herein will do the least possible harm to the plant and will tend to eliminate the breaking thereof which is the reason for provision of the rounded bottom 9.

It is thought that the construction, operation, utility, and advantages of this invention, will now be apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

The hood H has isinglass panels 24' mounted over openings therein in order that the driver of the tractor may see ahead.

Having thus described my invention, what I claim as new is:—

A device of the class described including, in combination, a pair of spaced parallel co-extensive beams, means for attaching the beams to a tractor one at each side thereof, a rectangular frame attached to the forward ends of the beams, a seed bottom detachably mounted below the frame, standards rising from the beams at the rear of the frame, a shaft journaled in said standards, an annular member on said shaft between said standards, a pair of standards rising from the sides of the frame, a beater journaled in said second standard at the upper extremities thereof, an annular member about the center of the beater, an endless member trained over the annular members and a hood rising from the rear portion of the frame over the beater.

In testimony whereof I affix my signature.

WILLIAM FREUND.